US011825204B2

(12) United States Patent
Maruyama et al.

(10) Patent No.: US 11,825,204 B2
(45) Date of Patent: Nov. 21, 2023

(54) APPARATUS FOR CONTROLLING EXPOSURE OF CAPTURING APPARATUS, METHOD FOR CONTROLLING THE SAME, AND STORAGE MEDIUM

(71) Applicant: CANON KABUSHIKI KAISHA, Tokyo (JP)

(72) Inventors: Naoki Maruyama, Tokyo (JP); Toshiyuki Dobashi, Kanagawa (JP); Shunsuke Chino, Saitama (JP); Seiya Ohta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/459,915

(22) Filed: Aug. 27, 2021

(65) Prior Publication Data
US 2022/0078325 A1 Mar. 10, 2022

(30) Foreign Application Priority Data

Sep. 9, 2020 (JP) ................ 2020-151228

(51) Int. Cl.
H04N 23/73 (2023.01)
H04N 5/202 (2023.01)
H04N 23/71 (2023.01)

(52) U.S. Cl.
CPC ............. *H04N 23/73* (2023.01); *H04N 5/202* (2013.01); *H04N 23/71* (2023.01)

(58) Field of Classification Search
CPC ........ H04N 23/73; H04N 5/202; H04N 23/71; H04N 23/72; H04N 7/183; H04N 5/2353; H04N 5/2351; G03B 7/28; G03B 7/091
See application file for complete search history.

(56) References Cited

U.S. PATENT DOCUMENTS

| 9,743,012 B2* | 8/2017 | Nakata ................. H04N 23/661 |
| 2009/0015689 A1* | 1/2009 | Murayama ........... H04N 13/133 348/229.1 |
| 2011/0013047 A1* | 1/2011 | Watanabe ............... G06T 5/009 348/E5.037 |
| 2015/0281476 A1* | 10/2015 | Watanabe .............. H04N 1/387 348/207.1 |
| 2020/0137281 A1* | 4/2020 | Omori .................... G06V 10/87 |

FOREIGN PATENT DOCUMENTS

JP 2007102284 A 4/2007

* cited by examiner

Primary Examiner — Luong T Nguyen
(74) Attorney, Agent, or Firm — CANON U.S.A., INC. IP Division

(57) ABSTRACT

An apparatus capable of communicating with a capturing apparatus includes a first acquisition unit configured to acquire an image captured by the capturing apparatus, a second acquisition unit configured to acquire first exposure information determined by the capturing apparatus based on a luminance of a first region in the image, a first determination unit configured to determine second exposure information based on a luminance of a second region, a second determination unit configured to determine correction information based on a difference between the first exposure information and the second exposure information, and an output unit configured to output the correction information to the capturing apparatus.

17 Claims, 11 Drawing Sheets

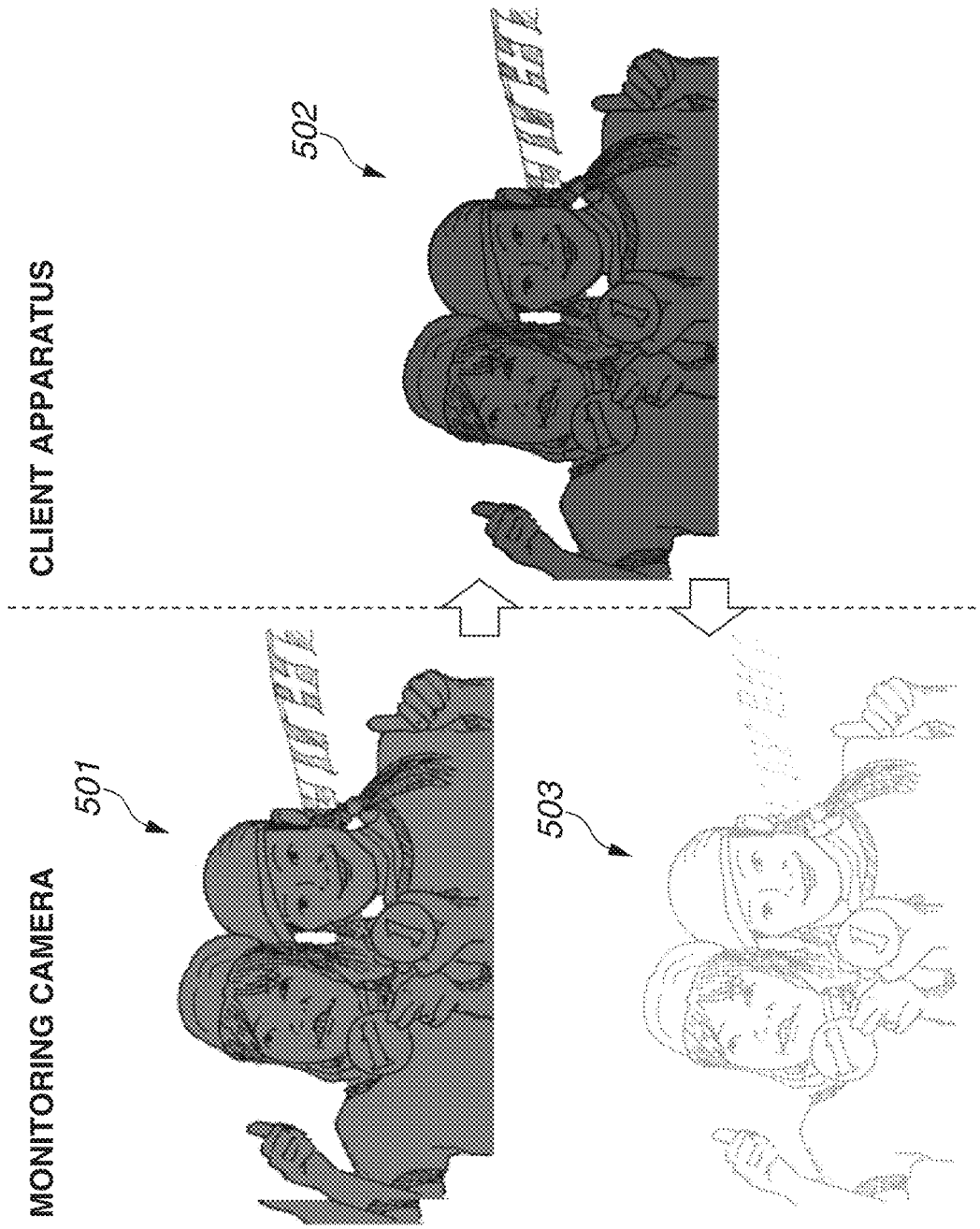

FIG.6A
EVALUATION REGION HISTOGRAM
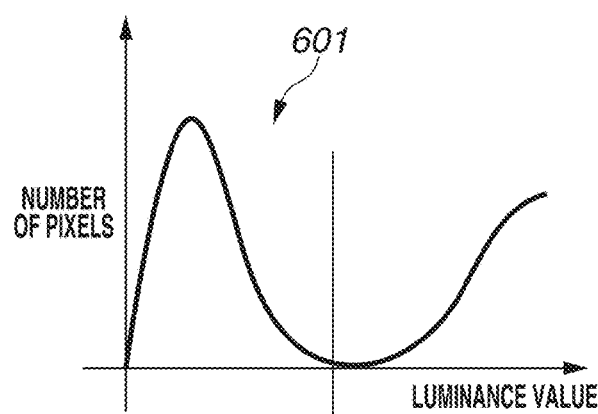
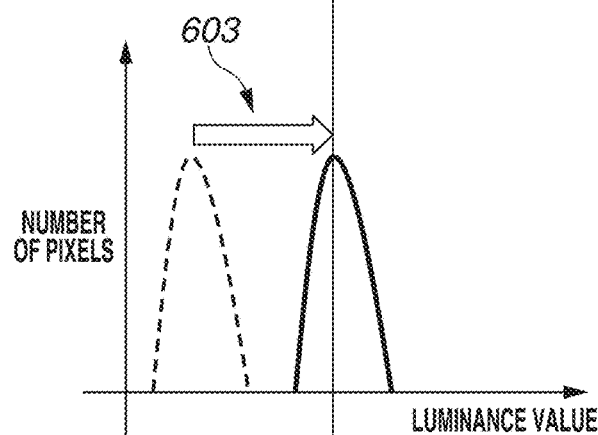
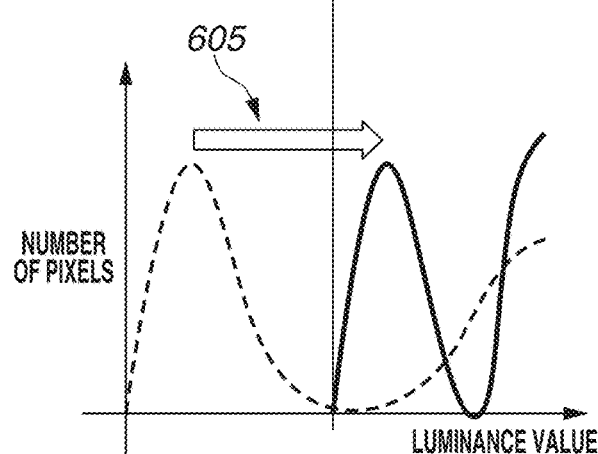
FIG.6B
LUMINANCE AVERAGE VALUE IN EVALUATION REGION
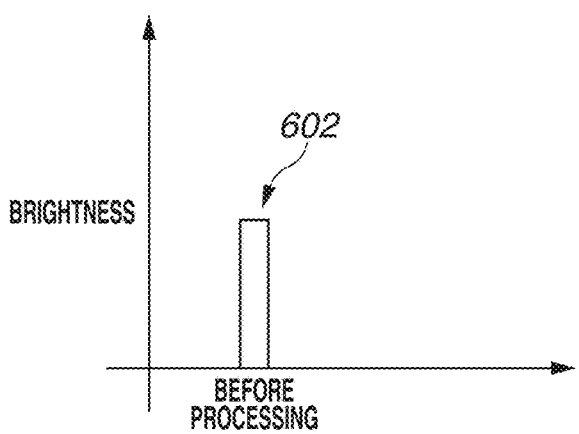
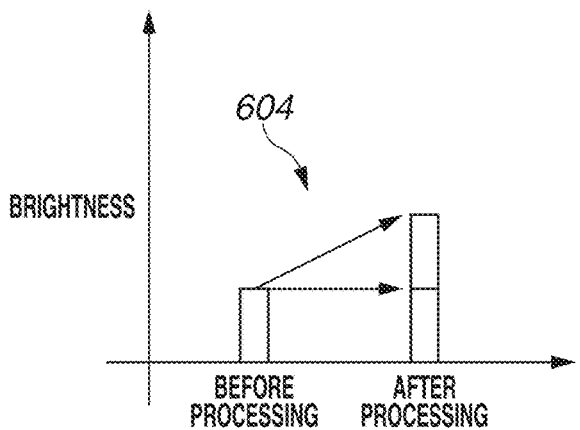
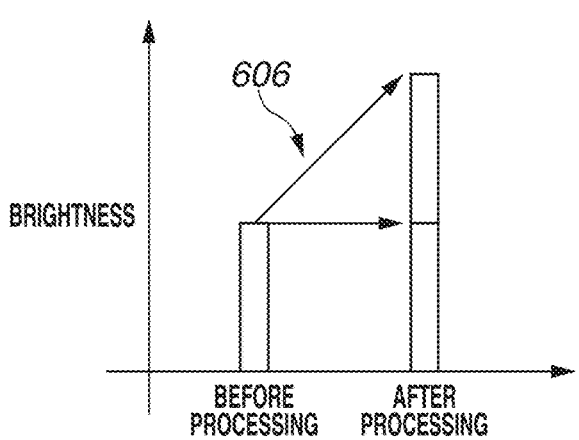

APPARATUS FOR CONTROLLING EXPOSURE OF CAPTURING APPARATUS, METHOD FOR CONTROLLING THE SAME, AND STORAGE MEDIUM

BACKGROUND OF THE DISCLOSURE

Field of the Disclosure

Aspects of the embodiments generally relate to an apparatus, a control method, and a storage medium.

Description of the Related Art

Conventionally, there is known a technique of, to bridge the difference between apparatuses in a case where a processing apparatus and an evaluation apparatus differ from each other, performing degamma processing to obtain an appropriate exposure determination value which does not depend on processing to be performed between the apparatuses, as discussed in Japanese Patent Application Laid-Open No. 4-165876 and Japanese Patent Application Laid-Open No. 2007-102284.

SUMMARY OF THE DISCLOSURE

Aspects of the embodiments are generally directed to an apparatus capable of communicating with a capturing apparatus includes a first acquisition unit configured to acquire an image captured by the capturing apparatus, a second acquisition unit configured to acquire first exposure information determined by the capturing apparatus based on a luminance of a first region in the image, a first determination unit configured to determine second exposure information based on a luminance of a second region, a second determination unit configured to determine correction information based on a difference between the first exposure information and the second exposure information, and an output unit configured to output the correction information to the capturing apparatus.

Further features of the present disclosure will become apparent from the following description of exemplary embodiments with reference to the attached drawings.

BRIEF DESCRIPTION OF THE DRAWINGS

FIG. 5 is a diagram used to explain processing to be performed between the monitoring camera and the client apparatus.

FIGS. 6A and 6B are diagrams used to explain a luminance state in an example illustrated in FIG. 5.

DESCRIPTION OF THE EMBODIMENTS

Figure 1:
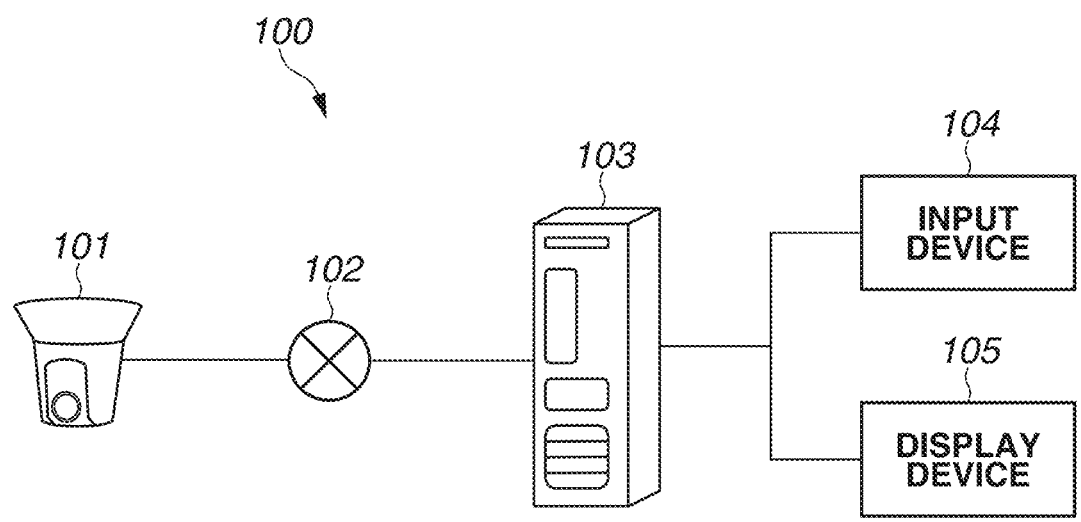
FIG. 1 is a diagram illustrating a configuration example of an image capturing control system.

Various exemplary embodiments, features, and aspects of the disclosure will be described in detail below with reference to the drawings.

First, common subject matter for use in describing various exemplary embodiments is described, and, then, the detailed description of exemplary embodiments is performed. Furthermore, the following exemplary embodiments are not intended to limit the present disclosure, and not all of the combinations of features described in the respective exemplary embodiments are necessarily essential for solutions in the present disclosure. The configuration of each exemplary embodiment can be modified or altered as appropriate according to specifications and various conditions (for example, use conditions and usage environments) of an apparatus to which the present disclosure is applied. Moreover, parts of respective exemplary embodiments to be described below can be configured in combination as appropriate. In the following exemplary embodiments, the same constituent elements are assigned the respective same reference characters for description thereof.

One or more functional blocks to be described below can be implemented by hardware, such as an ASIC or programmable logic array (PLA), or can be implemented by a programmable processor, such as a CPU or an MPU, executing software. Moreover, they can be implemented by a combination of software and hardware. Accordingly, in the following description, even in a case where different functional blocks are described as actors, the same hardware can be implemented as an actor. Furthermore, ASIC is an abbreviation for application specific integrated circuit. CPU is an abbreviation for central processing unit. MPU is an abbreviation for micro processing unit.

FIG. 1 is a diagram illustrating a configuration example of an image capturing control system 100 according to a first exemplary embodiment.

The image capturing control system 100 includes a monitoring camera 101, a network 102, a client apparatus 103, an input device 104, and a display device 105. The monitoring camera 101 is an image capturing apparatus for acquiring a moving image and is an apparatus capable of performing image capturing of, for example, a subject and image processing. The monitoring camera 101 and the client apparatus 103 are interconnected via the network 102 in such a way as to be able to communicate with each other. The client apparatus 103 is connected to the input device 104 and the display device 105 in such a way as to be able to communicate with them. The client apparatus 103 is an apparatus for processing various pieces of information and, therefore, can be referred to as an "information processing apparatus". Moreover, the client apparatus 103 is an apparatus for controlling an image capturing operation of the monitoring camera 101 and, therefore, can be referred to as an "image capturing control apparatus".

The input device 104 is configured with, for example, a mouse and a keyboard, and is configured to be operated by the user of the client apparatus 103.

The display device 105 is an apparatus including, for example, a monitor which displays an image received from the client apparatus 103. Furthermore, the display device 105 is also able to function as a UI, such as a touch panel.

In this case, the display device 105 becomes able to also function as an input device for inputting, for example, an instruction, information, and data to the client apparatus 103. UI is an abbreviation for user interface.

While, in FIG. 1, the client apparatus 103, the input device 104, and the display device 105 are illustrated as respective individual devices, the present exemplary embodiment is not limited to such a configuration. For example, the client apparatus 103 and the display device 105 can be integrated together, or the input device 104 and the display device 105 can be integrated together. Moreover, the client apparatus 103, the input device 104, and the display device 105 can be integrated together. In a case where the client apparatus 103 and the display device 105 are integrated together, an apparatus obtained by integration can be in the form of, for example, a personal computer, a tablet terminal, or a smartphone.

Figure 2:
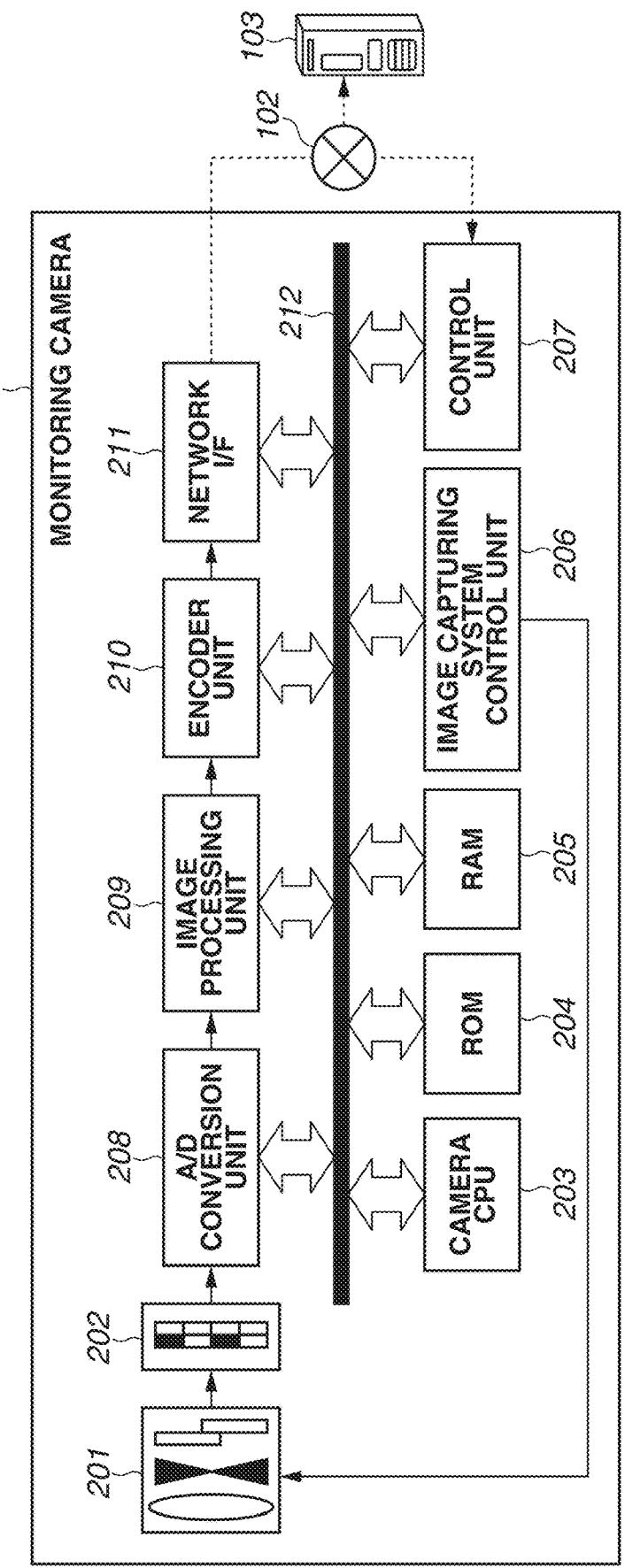
FIG. 2 is a diagram illustrating an internal configuration example of a monitoring camera.

FIG. 2 is a block diagram illustrating an internal configuration example of the monitoring camera 101.

The monitoring camera 101 includes an image capturing optical system 201 and an image sensor 202. The monitoring camera 101 further includes a camera CPU 203, a ROM 204, a RAM 205, an image capturing system control unit 206, a control unit 207, an A/D conversion unit 208, an image processing unit 209, an encoder unit 210, and a network I/F 211. The camera CPU 203 through the network I/F 211 of the monitoring camera 101 are interconnected via a system bus 212. Furthermore, CPU is an abbreviation for central processing unit. ROM is an abbreviation for read-only memory. A/D is an abbreviation for analog-to-digital. RAM is an abbreviation for random access memory. I/F is an abbreviation for interface.

The image capturing optical system 201 is configured with, for example, a zoom lens, a focus lens, an image shake correction lens, a diaphragm, and a shutter, and is an optical member group for collecting light coming from a subject. An optical image of light coming from, for example, a subject collected by the image capturing optical system 201 is formed on an imaging plane of the image sensor 202.

The image sensor 202 is a charge accumulation-type solid-state image sensor, such as a CMOS sensor or a CCD sensor, which converts the optical image of light collected by the image capturing optical system 201 into a current value (signal value), and is an image capturing unit which acquires color information in combination with, for example a color filter. CMOS is an abbreviation for complementary metal-oxide semiconductor. CCD is an abbreviation for charge-coupled device. The image sensor 202 is connected to the A/D conversion unit 208.

The A/D conversion unit 208 converts the amount of light detected by the image sensor 202 into a digital signal (image data). The A/D conversion unit 208 transmits the digital signal to the image processing unit 209.

The image processing unit 209 performs image processing on image data which is a digital signal received from the image sensor 202. The image processing unit 209 is connected to the encoder unit 210.

The encoder unit 210 performs processing for converting image data processed by the image processing unit 209 into a file format, such as Motion JPEG, H264, or H265. The encoder unit 210 is connected to the network I/F 211.

The camera CPU 203 is a control unit which comprehensively controls an operation of the monitoring camera 101. The camera CPU 203 reads an instruction stored in the ROM 204 or the RAM 205 and performs processing corresponding to the instruction.

The image capturing system control unit 206 controls each component of the monitoring camera 101 based on instructions issued from the camera CPU 203. For example, the image capturing system control unit 206 performs control operations, such as focus control, shutter control, and aperture adjustment, with respect to the image capturing optical system 201.

The network I/F 211 is an interface for use in communicating with an external apparatus, such as the client apparatus 103, via the network 102, and is controlled by the control unit 207.

The control unit 207 controls communication to be performed with the client apparatus 103, and performs control to, for example, transmit, to the camera CPU 203, a control instruction (control signal) issued by the client apparatus 103 to each component of the monitoring camera 101.

The network 102 is an Internet Protocol (IP) network used to interconnect the monitoring camera 101 and the client apparatus 103. The network 102 is configured with, for example, a plurality of routers compliant with a communication standard such as Ethernet, switches, and cables. In the present exemplary embodiment, the network 102 is a network capable of being used to enable communication between the monitoring camera 101 and the client apparatus 103, and does not have restrictions on, for example, its communication standard, scale, and configuration. For example, the network 102 can be configured with, for example, the Internet, a wired local area network (LAN), a wireless LAN, or a wide area network (WAN).

Figure 3:
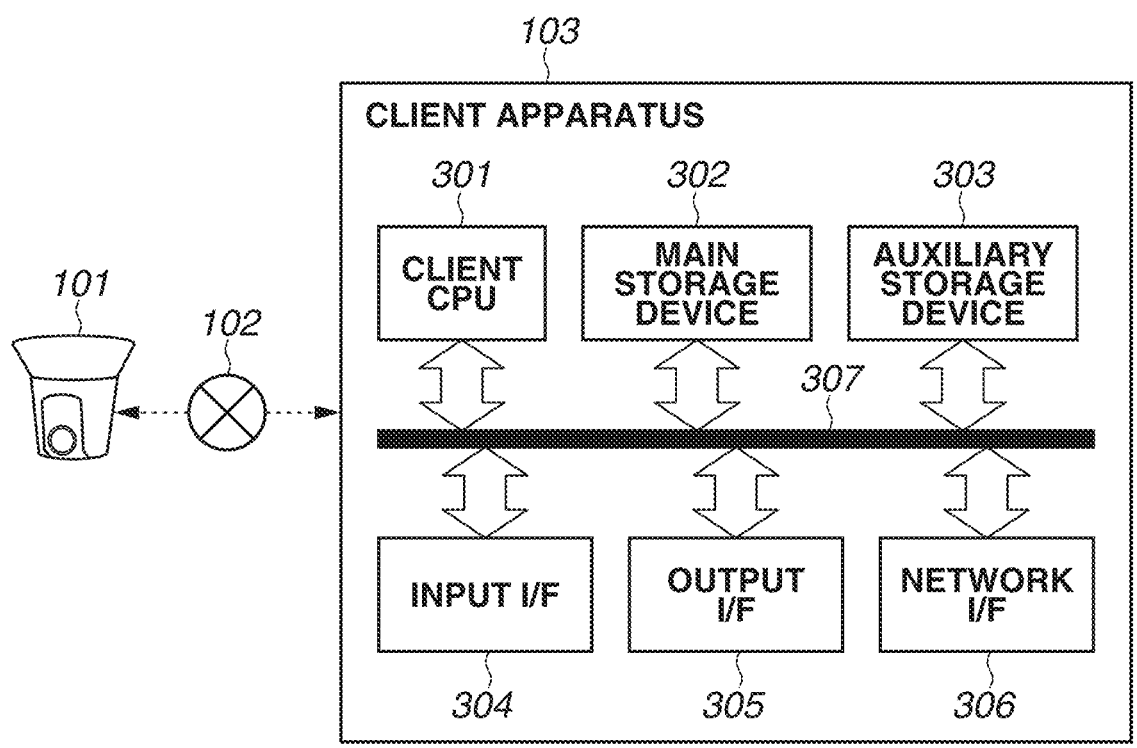
FIG. 3 is a diagram illustrating an internal configuration example of a client apparatus.

FIG. 3 is a block diagram illustrating an internal configuration example of the client apparatus 103.

The client apparatus 103 includes a client CPU 301, a main storage device 302, an auxiliary storage device 303, an input I/F 304, an output I/F 305, and a network I/F 306. The respective components of the client apparatus 103 are interconnected via a system bus 307 in such a way as to be able to communicate with each other.

The client CPU 301 is a central processing unit which comprehensively controls an operation of the client apparatus 103. Furthermore, the client CPU 301 can be configured to comprehensively control the monitoring camera 101 via the network 102.

The main storage device 302 is a storage device, such as a RAM, which functions as a temporary data storage location for the client CPU 301.

Figure 4:
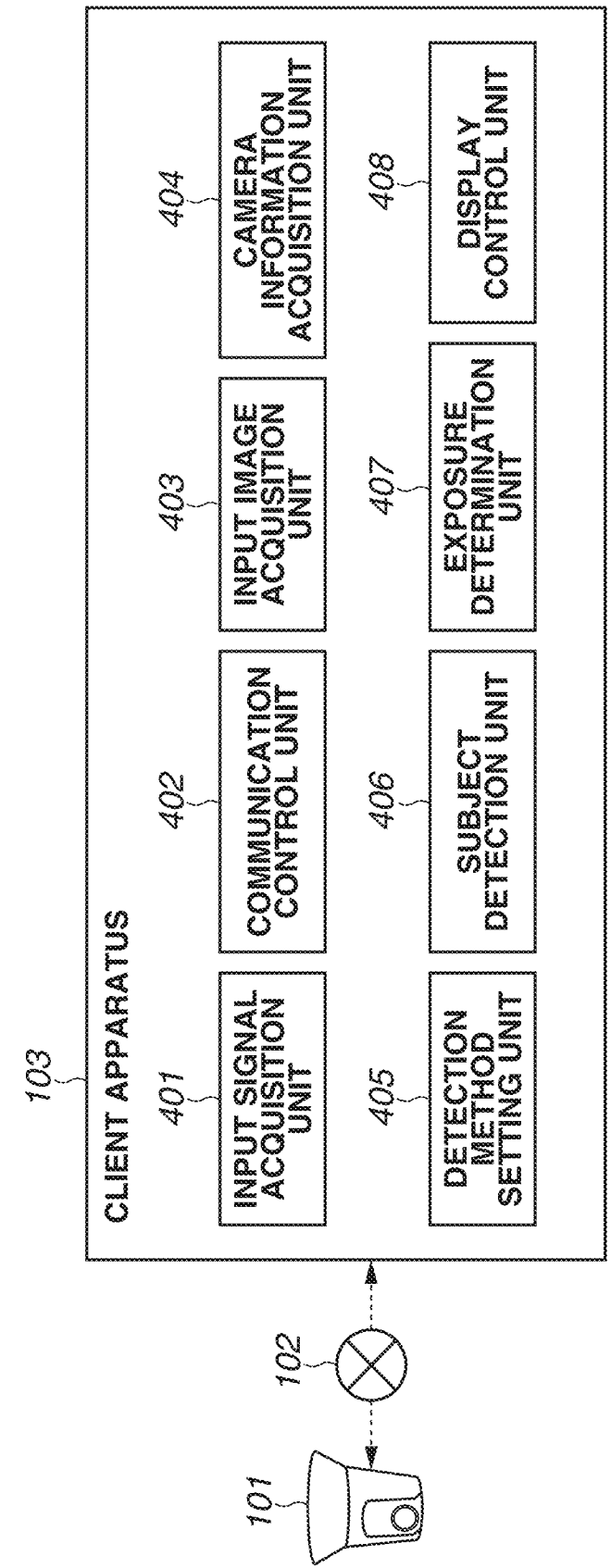
FIG. 4 is a diagram illustrating a functional configuration example of the client apparatus.

The auxiliary storage device 303 is a storage device, such as an HDD, a ROM, or an SSD, which stores, for example, various programs and various pieces of setting data. Furthermore, HDD is an abbreviation for hard disk drive. SSD is an abbreviation for solid state drive. Moreover, a program concerned with the present exemplary embodiment is stored in the auxiliary storage device 303. In the present exemplary embodiment, functions and processing operations of the client apparatus 103 illustrated in FIG. 4 are implemented by the client CPU 301 performing processing based on a program read out from the auxiliary storage device 303 and then loaded onto the main storage device 302. Details of this processing are described below. Moreover, the auxiliary storage device 303 can be configured to previously store therein, for example, patterns for pattern matching (patterns corresponding to characteristic portions of faces or characteristic portions of human bodies), which are used for the client apparatus 103 to perform face detection or human body detection based on image data. Furthermore, the patterns for pattern matching can be formed by execution of a program and then stored in the main storage device 302.

The input I/F 304 is an interface used for the client apparatus 103 to receive an input (signal) from, for example, the input device 104.

The output I/F 305 is an interface used for the client apparatus 103 to output information (signal) to, for example, the display device 105.

The network I/F 306 is an interface for use in communication with an external apparatus, such as the monitoring camera 101, via the network 102.

FIG. 4 is a functional block diagram illustrating functions which the client apparatus 103 executes. In other words, the functional units (functional blocks) illustrated in FIG. 4 are functional units which the client CPU 301 is able to execute, and these functional units are synonymous with the client CPU 301.

As illustrated in FIG. 4, the client CPU 301 of the client apparatus 103 includes, as functional units, an input signal acquisition unit 401, a communication control unit 402, an input image acquisition unit 403, a camera information acquisition unit 404, and a detection method setting unit 405. Moreover, the client CPU 301 further includes, as functional units, a subject detection unit 406, an exposure determination unit 407, and a display control unit 408. Furthermore, in the client apparatus 103, the functional units illustrated in FIG. 4, i.e., the input signal acquisition unit 401 through the display control unit 408, can be configured with hardware (or software) different from the client CPU 301.

The input signal acquisition unit 401 receives an input from the user via the input device 104.

The communication control unit 402 performs control to receive an image transmitted from the monitoring camera 101 (an image captured by the monitoring camera 101) via the network 102. Moreover, the communication control unit 402 performs control to transmit a control instruction issued by the client apparatus 103 to the monitoring camera 101 via the network 102.

The input image acquisition unit 403 acquires an image received from the monitoring camera 101 via the communication control unit 402, as an input image targeted for processing for detecting a subject (an image to which subject detection processing is applied). Details of the detection processing are described below.

The camera information acquisition unit 404 acquires, via the communication control unit 402, camera information to be used for the monitoring camera 101 to perform image capturing of, for example, a subject. The camera information includes various pieces of camera setting information and image processing information used for performing image capturing of, for example, a subject to acquire an image. Specifically, the camera information includes, for example, exposure parameters for, for example, aperture value, shutter speed, and gain (setting value concerning exposure) and information concerning image processing related to luminance, such as gamma correction, edge enhancement, and white balance.

The detection method setting unit 405 sets a predetermined (appropriate) detection method from among various detection methods including detection of a face region (face detection) or detection of a human body region (human body detection) with respect to an input image acquired by the input image acquisition unit 403. In the present exemplary embodiment, the detection method setting unit 405 sets (selects) a detection method for face detection or a detection method for human body detection.

The subject detection unit 406 detects a specific subject region from within an input image captured by the monitoring camera 101 and acquired by the input image acquisition unit 403. For example, in a case where performing face detection has been set by the detection method setting unit 405, the subject detection unit 406 detects a face region from the input image. Moreover, for example, in a case where performing human body detection has been set by the detection method setting unit 405, the subject detection unit 406 detects a human body region from the input image.

Furthermore, the present exemplary embodiment is not limited to such a setting. For example, a detection method for detecting a feature region of a part of a person, such as the upper body of the person or some of organs such as the head or the eye, nose, or mouth of the face, can be set (can be selected). Moreover, while, in the present exemplary embodiment, a specific subject targeted for detection is assumed to be a person, a configuration capable of detecting a feature region related to a specific subject other than persons can be employed. For example, a configuration capable of detecting a specific subject previously set in the client apparatus 103, such as the face of an animal or an automobile, can also be employed.

The exposure determination unit 407 has the function of determining, based on an exposure setting value for the monitoring camera 101 acquired by the camera information acquisition unit 404 and image information about a subject region detected by the subject detection unit 406, an exposure amount of the detected subject region. In addition, the exposure determination unit 407 also has the function of performing exposure control of the monitoring camera 101 based on the determined exposure amount. Exposure control of the monitoring camera 101 in the exposure determination unit 407 is performed by transmitting an exposure control value that is based on the determined exposure amount to the monitoring camera 101 via the communication control unit 402. Specifically, the exposure determination unit 407 calculates an exposure correction amount representing an amount of change of exposure for bringing a subject region into a correct exposure state, based on a difference between the exposure setting value of the monitoring camera 101 and the image information about the subject region, and transmits an exposure control value corresponding to the calculated exposure correction amount to the communication control unit 402. Then, the communication control unit 402 transmits a control instruction corresponding to the exposure control value (exposure correction amount) to the monitoring camera 101 via the network I/F 306. With this processing, in the monitoring camera 101 having received the control instruction, exposure control is performed by the control unit 207 or the image capturing system control unit 206. Furthermore, the exposure determination unit 407 can be configured to transmit not the exposure control value but the calculated exposure correction amount to the communication control unit 402 and transmit not the control instruction but the exposure correction amount (exposure correction value) to the monitoring camera 101 via the network I/F 306. In this case, the monitoring camera 101 calculates an exposure control value corresponding to the input exposure correction amount and controls exposure based on the calculated exposure control value. The exposure control value as mentioned here is a parameter for use in controlling exposure for the monitoring camera 101, and indicates, for example, an aperture value, an exposure time, and an analog gain and a digital gain. In other words, the exposure determination unit 407 determines correction information (exposure correction amount or exposure control value) for bringing a subject region into a correct exposure state, based on a difference between the exposure setting value for the monitoring camera 101 and luminance information about the subject region, and outputs the correction information to the monitoring camera 101 via the network I/F 306.

Moreover, in the present exemplary embodiment, the exposure determination unit 407 is configured to perform exposure control using at least a first exposure correction method and a second exposure correction method. While details thereof are described below, for example, the exposure determination unit 407 performs coarse adjustment for changing exposure for the monitoring camera 101 at a stretch up to a predetermined amount as a first exposure correction method and, from that point onwards, performs exposure control by a second exposure correction method for finely adjusting exposure for the monitoring camera 101. Particularly, in a case where the calculated exposure correction amount is larger than a predetermined amount (in a case where the amount of change of exposure is large), the exposure determination unit 407 performs coarse adjustment for changing exposure at a stretch up to the predetermined amount and, from that point onwards, performs fine adjustment. On the other hand, in a case where the calculated exposure correction amount is smaller than or equal to the predetermined amount, the exposure determination unit 407 performs control to change exposure at a stretch up to the exposure correction amount in a period of coarse adjustment. Details of such processing performed by the exposure determination unit 407 are described below with reference to, for example, the flowchart of FIG. 7.

The display control unit 408 outputs, to the display device 105, a captured image in which exposure correction using the exposure correction amount determined by the exposure determination unit 407 has been reflected, in response to an instruction from the client CPU 301.

With the above-described configuration employed, in a case where the client apparatus 103 performs exposure control of the monitoring camera 101, the client apparatus 103 performs degamma processing as mentioned above and thus correctly determines the brightness of an image which the image sensor 202 of the monitoring camera 101 outputs. However, since the monitoring camera 101 and the client apparatus 103 differ from each other in a method for determining an exposure state, it is necessary to take into consideration such a difference in the determination method.

In the following description, for example, the monitoring camera 101 is assumed to set the whole image as a light metering area and determine an exposure amount based on a luminance acquired in the whole image. On the other hand, the client apparatus 103 is assumed to set, for example, a subject region, such as a person, extracted from the image as a light metering area and perform exposure determination based on information about a luminance acquired in the subject region. Thus, while the monitoring camera 101 determines an exposure amount with the whole image set as an evaluation range for exposure setting, the client apparatus 103 performs exposure determination with a subject region in the image set as an evaluation range for exposure setting. In the present exemplary embodiment, a scene directed to enabling image capturing in which a subject region is exposed with appropriate brightness in a case where the monitoring camera 101 and the client apparatus 103 differ from each other in an evaluation region for exposure state determination is assumed.

FIG. 5 is a diagram used to explain an exchange of processing between a monitoring camera and a client apparatus, and illustrates a specific example in a case where exposure control for the monitoring camera has not been appropriately performed. Moreover, FIGS. 6A and 6B are diagrams used to explain the manner of luminance of an image in each state illustrated in FIG. 5. FIG. 6A illustrates histograms each representing a relationship between a luminance value and the number of pixels in an image, and FIG. 6B is a diagram illustrating average values of luminance in an image.

An image 501 illustrated in FIG. 5 indicates an image in an initial state obtained by the monitoring camera capturing an image of the subject, and is an example of an image captured in a backlit scene. In the backlit scene, usually, the region of a person serving as a subject becomes dark and the surroundings thereof become bright. Even in such a case, to accurately perform recognition of a person, the image is to be set to an exposure state in which the brightness of the region of a person becomes appropriate.

A graph 601 illustrated in FIG. 6A represents a distribution of luminance obtained in a state of brightness such as an image 501 illustrated in FIG. 5. In the case of the image 501, which is in a backlit state, the luminance distribution is, therefore, in a state in which a dark portion and a bright portion are dominant in the image 501 as shown in the graph 601. Then, a graph 602 illustrated in FIG. 6B represents the amount of brightness of the entire image serving as a light metering area (an evaluation region for exposure determination) for use in the monitoring camera, into which the luminance distribution represented by the graph 601 has been converted.

Moreover, an image 502 illustrated in FIG. 5 represents an example of an image obtained by the client apparatus performing degamma processing to reproduce a state of brightness which the actual image sensor captures, in such a way as not to be affected by an image capturing condition for use in the monitoring camera. At this time, the client apparatus extracts the brightness while focusing on persons as a light metering area (an evaluation region for exposure determination), and, since persons are dark as shown in the image 502, the client apparatus seeks to increase exposure up to an appropriate brightness. Thus, as indicated by an arrow 603 illustrated in FIG. 6A, the client apparatus seeks to perform adjustment to bring the present brightness of persons indicated by a dashed line shown near the base of the arrow 603 into an appropriate brightness indicated by a solid line shown near the tip of the arrow 603. The processing indicated by the arrow 603 is assumed to be, for example, processing for adjusting an exposure level in such a manner that the present brightness obtained before processing becomes a twofold brightness, as indicated by a graph 604 illustrated in FIG. 6B.

Then, if exposure control of the monitoring camera is performed based on an instruction from such a client apparatus, over correction may be performed as in an image 503 illustrated in FIG. 5, so that a loss of highlight detail may occur in the region of persons. For example, in the case of performing exposure control to obtain a twofold brightness, since the monitoring camera adjusts brightness with the entire captured image used as an evaluation region, a high-luminance portion enters into a saturation state, in which the portion is unable to be made brighter any more. Thus, as indicated by an arrow 605 illustrated in FIG. 6A, the monitoring camera performs adjustment of exposure in such a way as to make the brightness of a low-luminance portion indicated by a dashed line shown near the base of the arrow 605 two or more times and make the entire brightness two times as indicated by a solid line shown near the tip of the arrow 605. A graph 606 illustrated in FIG. 6B represents amounts of brightness obtained before and after exposure control performed in such a way as to make the brightness of the low-luminance portion two or more times and make the entire brightness two times.

As mentioned above, in a case where an evaluation region differs between on the side of the monitoring camera and on the side of the client apparatus, for example, even if making the brightness of a person appropriate is tried, over correction may be performed. Thus, in a case where an evaluation region differs between on the side of the monitoring camera and on the side of the client apparatus, the possibility that appropriate exposure control is unable to be performed becomes high.

In the first exemplary embodiment, a configuration and a processing operation which enable performing appropriate exposure control even if, as mentioned above, a target for exposure evaluation (evaluation region) differs between on the side of the monitoring camera and on the side of the client apparatus are described. Furthermore, in the present exemplary embodiment, correction information for controlling exposure for the monitoring camera 101 is described as an exposure correction amount, but can be an exposure control value as mentioned above.

Figure 7:
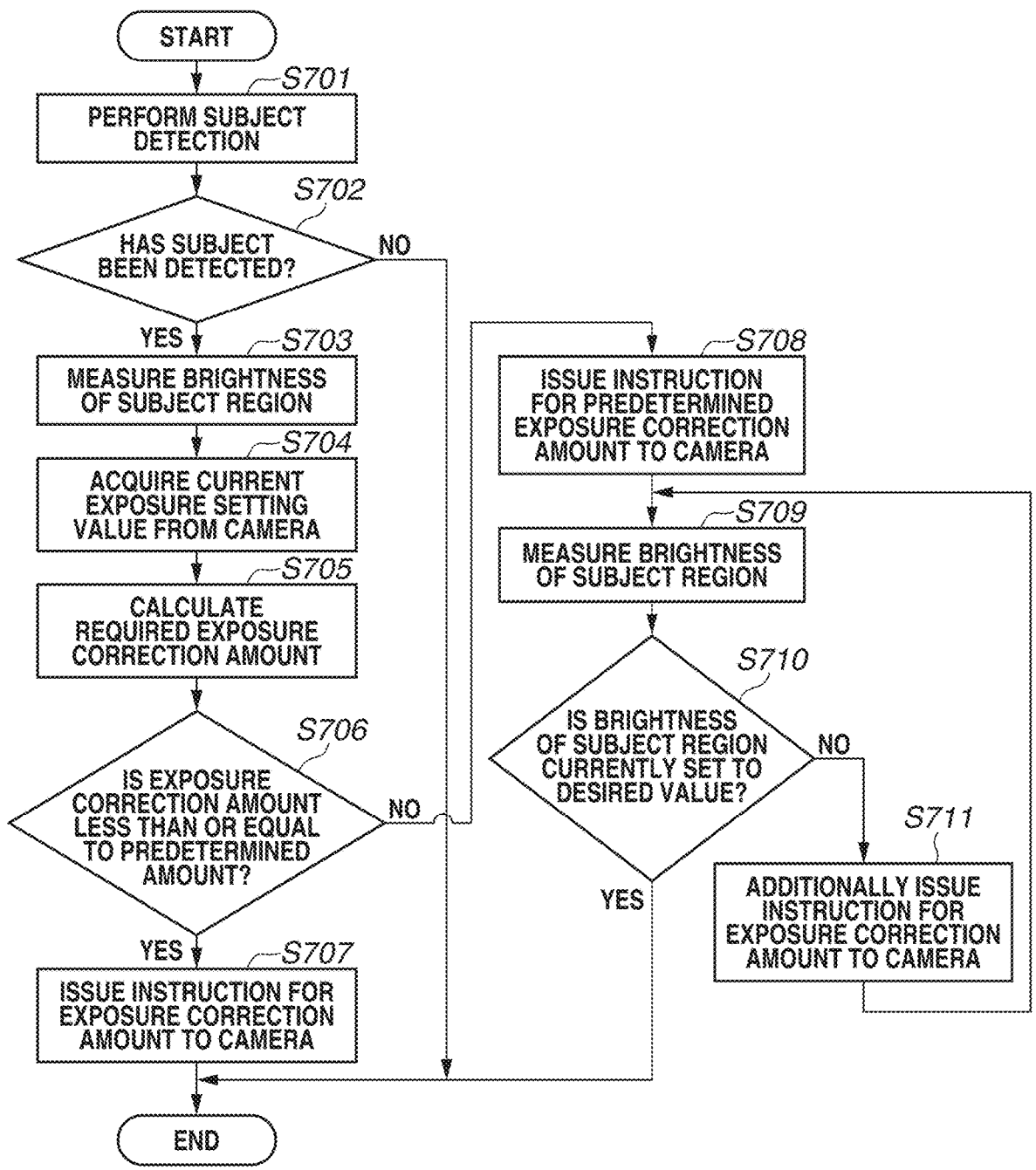
FIG. 7 is a flowchart of exposure control processing according to a first exemplary embodiment.

FIG. 7 is a flowchart illustrating the flow of subject detection processing through exposure control processing which are performed by the client CPU 301 of the client apparatus 103 according to the first exemplary embodiment. Furthermore, in the image capturing control system 100 illustrated in FIG. 1, the monitoring camera 101, the client apparatus 103, the input device 104, and the display device 105 are assumed to be previously powered on and a connection (communication) between the monitoring camera 101 and the client apparatus 103 are assumed to be previously established. Moreover, in this state, image capturing of, for example, a subject with a predetermined updating cycle by the monitoring camera 101, transmission of image data from the monitoring camera 101 to the client apparatus 103, and image display by the display device 105 are assumed to be continuously repeated. Then, the processing illustrated in the flowchart of FIG. 7 is assumed to be started by the client CPU 301 in response to a captured image of, for example, a subject being input from the monitoring camera 101 to the client apparatus 103 via the network 102.

First, in step S701, the subject detection unit 406 performs processing for detecting a subject from an image transmitted from the monitoring camera 101. In the present exemplary embodiment, an example in which a human body or a face is detected as a subject is taken, and, therefore, prior to detection processing for a subject, the detection method setting unit 405 sets a detection method for a face or human body to the subject detection unit 406. Then, the subject detection unit 406 performs face detection processing or human body detection processing on an input image according to the setting performed by the detection method setting unit 405. Patterns respectively corresponding to feature portions of faces or feature portions of human bodies are previously stored in the auxiliary storage device 303 of the client apparatus 103, and the subject detection unit 406 performs detection of a face region or a human body region by pattern matching that is based on the stored patterns.

Furthermore, in the case of detecting a face region, usually, it is possible to detect a face with a high degree of accuracy and it is possible to clearly discriminate between a face region of the subject and a region other than the face region. However, in a case where, for example, the direction of the face, the size of the face, or the brightness of the face is not in a condition adapted for face detection, it may not be possible to accurately detect the face region. On the other hand, in the case of detecting a human body, it is possible to detect a region in which a person is present, irrespective of, for example, the direction of the face, the size of the face, or the brightness of the face. Furthermore, human body detection in the present exemplary embodiment does not necessarily need to detect the whole body, but can detect the upper half of the body, the upper body above the breast, or a head region including the face.

Moreover, in the case of employing a pattern matching method as a detection method for a subject, patterns (classifiers) created by using statistical learning can be used as patterns for use in the pattern matching method. Alternatively, subject detection can be performed by using a method other than the pattern matching method. For example, subject detection can be performed with use of a luminance gradient within a local region in the image. Thus, the detection method for a subject is not limited to a specific detection method, and can include various methods, such as detection that is based on machine learning and detection that is based on distance information.

Next, in step S702, the subject detection unit 406 determines whether a subject (a face region or a human body region) has been detected from within the image by the subject detection processing performed in step S701. Then, if it is determined that at least one subject has been detected (YES in step S702), the client CPU 301 advances the processing to step S703, and, on the other hand, if it is determined that no subject has been detected (NO in step S702), the client CPU 301 ends the present processing.

In step S703, the exposure determination unit 407 measures the brightness (luminance) of the subject region.

Next, in step S704, the exposure determination unit 407 acquires the current exposure value acquired from the monitoring camera 101 by the camera information acquisition unit 404 (the current exposure setting value of the monitoring camera 101).

Next, in step S705, the exposure determination unit 407 calculates an exposure correction amount representing a change amount (correction amount) for exposure (exposure value) for bringing the subject region into a correct exposure state, based on information about the brightness of the subject region and the current exposure setting value of the monitoring camera 101. More specifically, the exposure determination unit 407 calculates an exposure value for bringing the subject region into a correct exposure state, from luminance information about the subject region. The exposure determination unit 407 determines correction information concerning exposure for the monitoring camera 101 based on a difference between the calculated exposure value and the current exposure setting value of the monitoring camera 101. The correction information can be an exposure correction amount (exposure correction value) for the monitoring camera 101, or can be an exposure control value (an exposure time or a gain control value).

Next, in step S706, the exposure determination unit 407 determines whether the exposure correction amount (exposure change amount) is less than or equal to a predetermined amount. Then, if, in step S706, it is determined that the exposure correction amount is less than or equal to the predetermined amount (YES in step S706), the client CPU 301 advances the processing to step S707, and, on the other hand, if it is determined that the exposure correction amount exceeds the predetermined amount (NO in step S706), the client CPU 301 advances the processing to step S708. Thus, in step S706, the exposure determination unit 407 performs processing for determining the extent to which the exposure correction amount (correction information) representing the change amount for exposure is. This is because, as mentioned above, in a case where the evaluation region (light metering region) differs between on the side of the monitoring camera and on the side of the client apparatus, the exposure correction amount calculated by the client apparatus is likely to become a correction amount greatly different from the reality. Accordingly, in a case where the exposure correction amount (correction information) is greater than the predetermined amount (a case where the change amount for exposure is large), the exposure determination unit 407 does not change exposure at a stretch with the calculated exposure correction amount but performs coarse adjustment to change exposure at a stretch up to a certain degree of amount and, from that point onwards, progressively performs fine adjustment. In other words, in a case where the exposure correction value or exposure control value serving as correction information is larger than a predetermined value, the exposure determination unit 407 additionally determines correction information in such a way as to modify (coarsely adjust) the correction information according to a predetermined value and, from that point onwards, finely adjust the luminance of the evaluation region on the side of the client apparatus. In this way, it becomes easy to perform matching of brightness, and it is possible to prevent or reduce an adverse effect in which, if coarse adjustment is performed, hunting of luminance occurs. Moreover, it is possible to reduce the possibility that the exposure correction for the monitoring camera to be performed with the correction information determined by the exposure determination unit 407 becomes over correction. Furthermore, the evaluation region (light metering region) for the client apparatus is a first region, and the evaluation region (light metering region) for the monitoring camera is a second region. Moreover, the evaluation region (light metering region) for the client apparatus, which is the first region, is to be a region including a main subject (for example, a human body, a face, or an animal such as a bird or cat).

Figure 8:
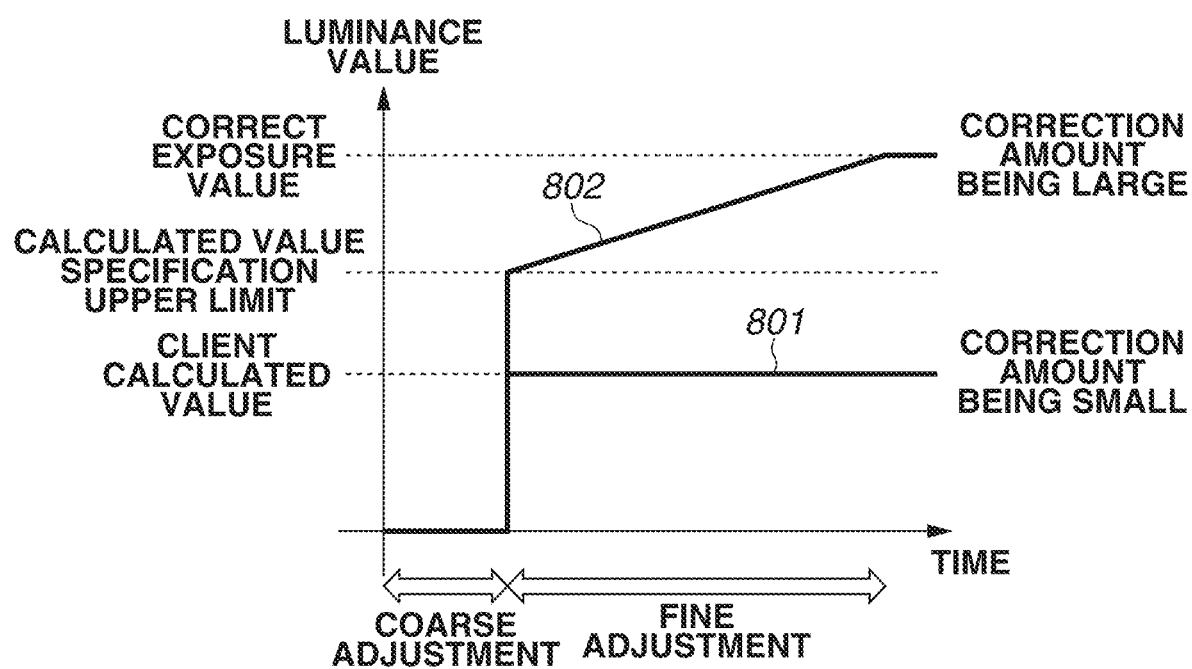
FIG. 8 is a diagram used to explain processing for changing exposure control.

FIG. 8 is diagram used to explain an example of such exposure adjustment. In the example illustrated in FIG. 8, a previously determined specification upper limit is taken as a predetermined amount (a predetermined value) for use in determination with respect to the exposure correction amount. In a case where the exposure correction amount calculated in step S705 is less than or equal to the specification upper limit, the exposure determination unit 407 follows a transition for correction amount being small indicated by a solid line 801 illustrated in FIG. 8, thus changing the exposure for the monitoring camera at a stretch up to the exposure correction amount in a coarse adjustment period. On the other hand, in a case where the exposure correction amount calculated in step S705 is greater than the specification upper limit, the exposure determination unit 407 follows a transition for correction amount being large indicated by a solid line 802 illustrated in FIG. 8, thus changing the exposure for the monitoring camera at a stretch up to the specification upper limit in the coarse adjustment period. Thus, the exposure determination unit 407 updates the exposure correction amount to the specification upper limit (the predetermined value). Then, after reaching the specification upper limit value, the exposure determination unit 407 performs exposure control in such a way as to gradually change the exposure level until correct exposure is attained in the subject region. Thus, the exposure determination unit 407 determines the exposure correction amount again based on luminance information about the second region.

Furthermore, the predetermined amount, which is used for comparison with the exposure correction amount, can be changed as appropriate according to a degree of coincidence indicating to what degree the evaluation region for the monitoring camera and the evaluation region for the monitoring camera coincide with each other. Moreover, in a case where exposure control such as that indicated by the solid line 801 illustrated in FIG. 8 is performed, the specification upper limit, which is used for changing exposure at a stretch, can be a value different from the predetermined amount for use in comparison with the exposure correction amount.

In step S707, to which the processing has proceeded after, in step S706, it is determined that the exposure correction amount is less than or equal to the predetermined amount, the exposure determination unit 407 outputs, to the monitoring camera 101 via the communication control unit 402, an instruction for controlling exposure for the monitoring camera 101 according to the exposure correction amount calculated in the above-described way. With this processing, the monitoring camera 101 performs exposure control based on the instruction corresponding to the exposure correction amount, thus becoming able to capture an image in which the subject has a correct brightness.

On the other hand, in step S708, to which the processing has proceeded after, in step S706, it is determined that the exposure correction amount exceeds the predetermined amount, the exposure determination unit 407 outputs, to the monitoring camera 101 via the communication control unit 402, an instruction for controlling exposure for the monitoring camera 101 as indicated by the correction amount being large illustrated in FIG. 8.

Next, in step S709, the exposure determination unit 407 measures the brightness of the subject region of an image obtained after exposure control is performed in the above-described way, and then, in step S710, the exposure determination unit 407 determines whether exposure of the subject region is currently set to a desired correct value. Then, if, in step S710, it is determined that the exposure is currently set to the correct value (YES in step S710), the client CPU 301 ends the processing in the flowchart of FIG. 7. On the other hand, if, in step S710, it is determined that the exposure is not currently set to the correct value (NO in step S710), then in step S711, the exposure determination unit 407 additionally performs exposure adjustment for the monitoring camera 101 via the communication control unit 402, and then returns the processing to step S709. Then, in step S709, the exposure determination unit 407 measures the brightness of the subject region again, and performs determination processing in step S710. Furthermore, in one embodiment, the exposure adjustment in step S711 do not greatly change exposure as mentioned above but progressively change exposure while performing fine adjustment. Moreover, in a case where the exposure determination unit 407 returns the processing to step S709 and re-measures the brightness of the subject region, the exposure determination unit 407 performs measurement after an interval of a predetermined time in consideration of a time until exposure adjustment performed by the monitoring camera 101 is reflected.

Performing the above-described processing enables obtaining an image in which the subject region is set to a correct exposure.

Figure 9:
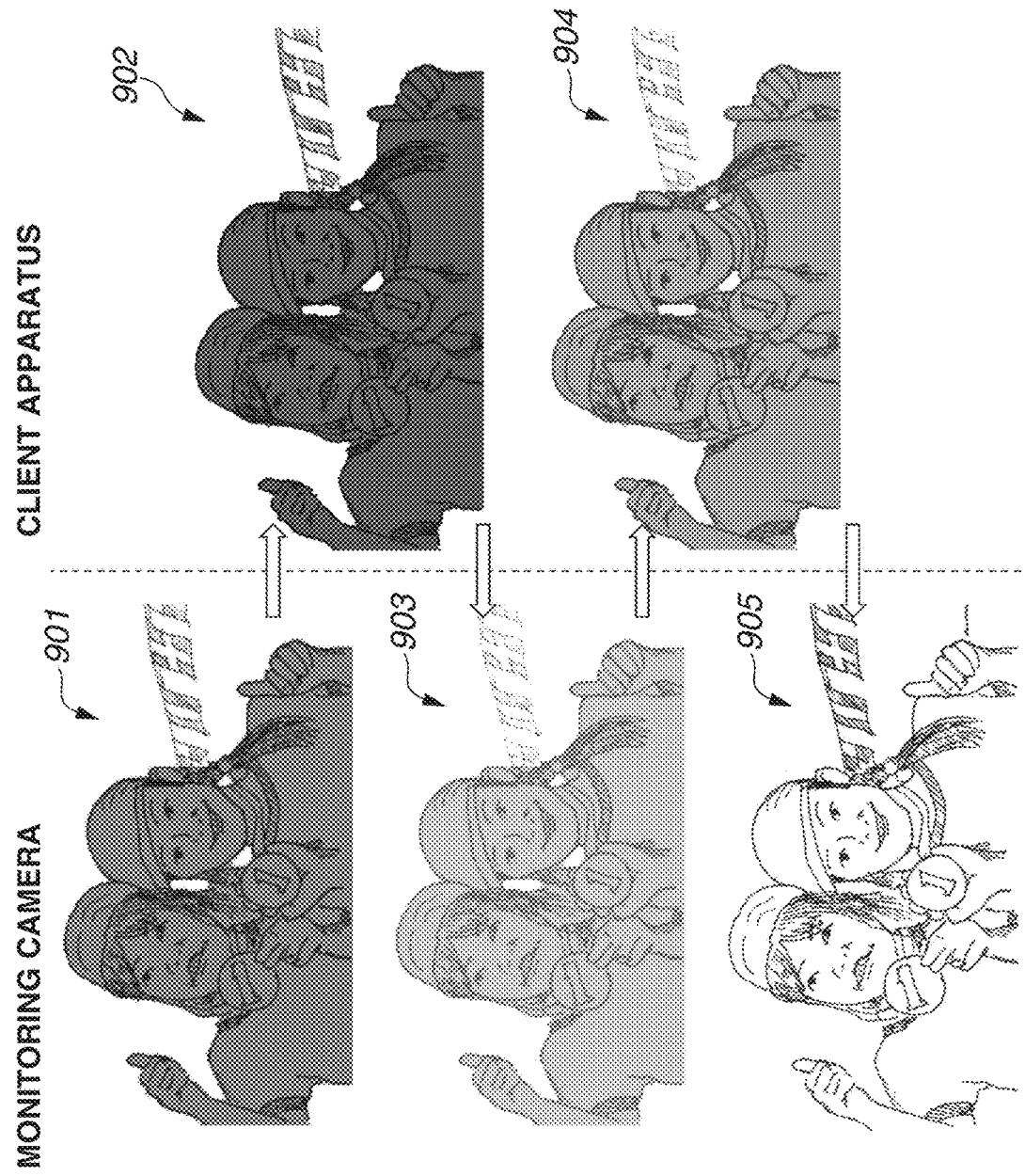
FIG. 9 is a diagram used to explain processing to be performed in a case where exposure control in the first exemplary embodiment has been performed.

FIG. 9 is a diagram used to explain an exchange of processing between the monitoring camera and the client apparatus in the above-described first exemplary embodiment, and illustrates a specific example in a case where exposure control for the camera has been appropriately performed.

As with the image 501 illustrated in FIG. 5, an image 901 illustrated in FIG. 9 indicates an image in an initial state obtained by the monitoring camera capturing an image of the subject, and is an example of an image captured in a backlit scene.

The client apparatus performs processing for exposure evaluation such as that described above based on an image 902 similar to the image 502 illustrated in FIG. 5. While, at this time, since a region of persons in the image 902 is dark, the client apparatus issues an instruction to increase an exposure, in this case, since the exposure correction amount becomes large, the client apparatus performs coarse adjustment once as mentioned above and then performs control to restrict the exposure correction amount up to a certain degree once. An image 903 is an example of an image captured by the monitoring camera which has been controlled for exposure by the client apparatus in the above-described way.

Then, the client apparatus detects the brightness of a subject again, performs fine adjustment in such a way as to gradually change the brightness as indicated in an image 904, and performs exposure control of the monitoring camera in such a manner that the subject is set to a correct brightness. An image 905 is an example of an image which is obtained by such exposure control being performed in the monitoring camera.

As described above, in the first exemplary embodiment, performing changing of the brightness in a stepwise fashion enables acquiring an image with an appropriate brightness even in a case where an evaluation region differs between the monitoring camera and the client apparatus.

In a second exemplary embodiment, processing obtained by adding degamma processing to the processing described in the first exemplary embodiment is described. The degamma processing is processing used to attain a stable brightness which does not depend on a setting condition, such as exposure, of the monitoring camera 101, as mentioned above. In the second exemplary embodiment, adding degamma processing enables implementing more appropriate processing than in the first exemplary embodiment.

Figure 10:
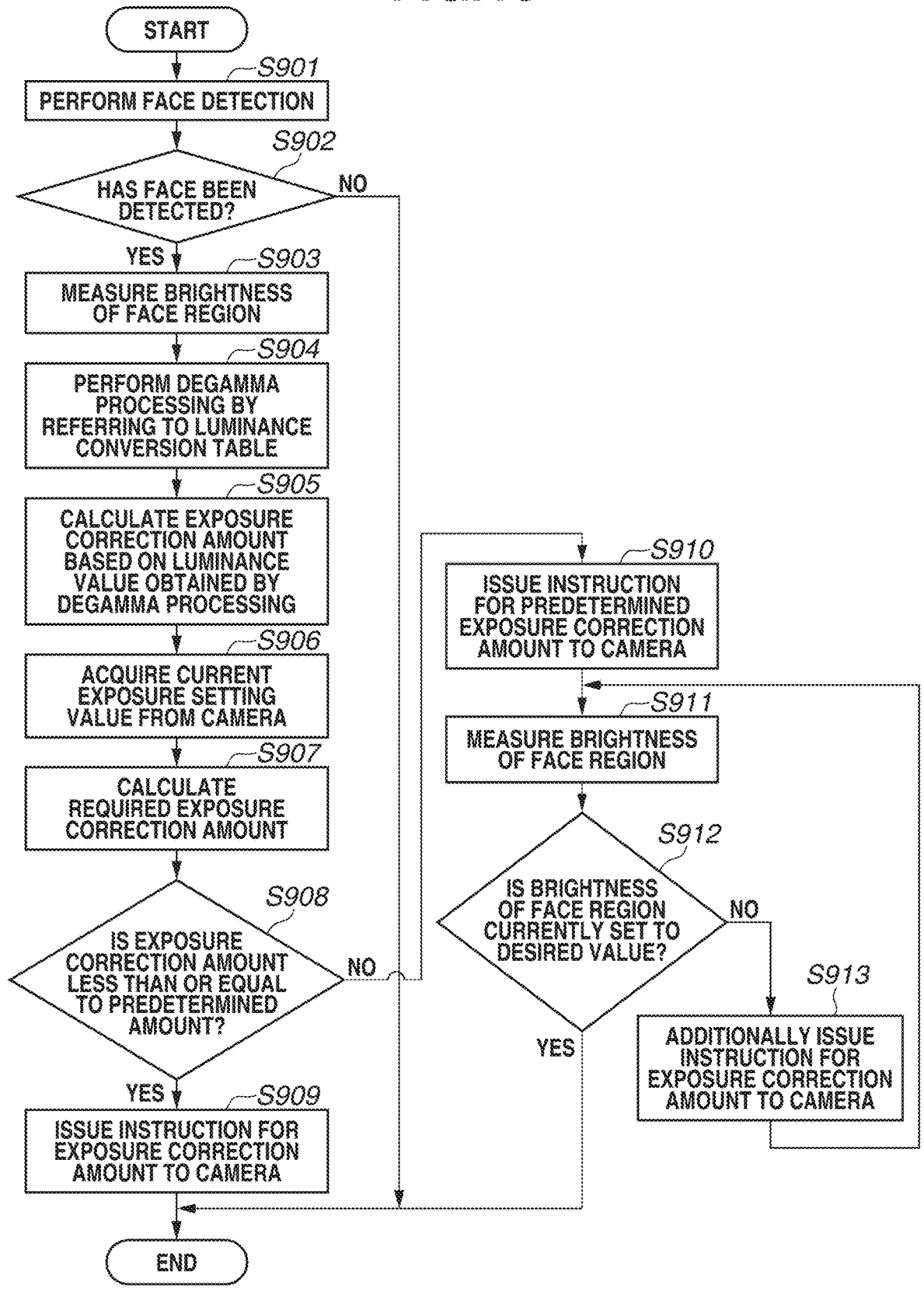
FIG. 10 is a flowchart of exposure control processing according to a second exemplary embodiment.

FIG. 10 is a flowchart illustrating the flow of processing which is performed by the client CPU 301 in the second exemplary embodiment. In the processing illustrated in the flowchart of FIG. 10, as with the above-described processing, the monitoring camera 101, the client apparatus 103, the input device 104, and the display device 105 are assumed to be previously powered on and a connection (communication) between the monitoring camera 101 and the client apparatus 103 are assumed to be previously established. Moreover, in this state, transmission of image data from the monitoring camera 101 to the client apparatus 103 and image display by the display device 105 are assumed to be continuously repeated. Then, the processing illustrated in the flowchart of FIG. 10 is assumed to be started by the client CPU 301 in response to a captured image of a subject being input from the monitoring camera 101 to the client apparatus 103 via the network 102.

First, in step S901, as with step S701 illustrated in FIG. 7, the subject detection unit 406 performs processing for detecting a subject from an image transmitted from the monitoring camera 101.

Next, in step S902, the subject detection unit 406 determines whether a subject (in this example, being assumed to be a face) has been detected. If, in step S902, it is determined that no subject has been detected (NO in step S902), the client CPU 301 ends the processing illustrated in the flowchart of FIG. 10, and, on the other hand, if it is determined that a subject has been detected (YES in step S902), the client CPU 301 advances the processing to step S903.

In step S903, the exposure determination unit 407 measures the brightness of the subject region (face region).

In step S904, the exposure determination unit 407 performs degamma processing by referring to a luminance conversion table (degamma table).

Figure 11:
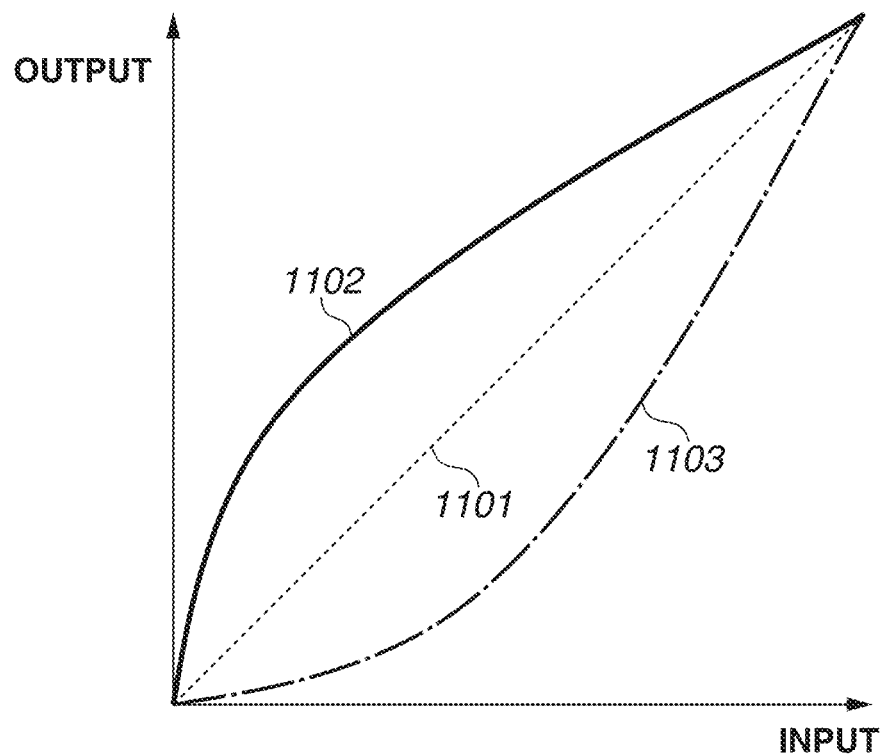
FIG. 11 is a diagram illustrating characteristics of gamma processing and degamma processing.

FIG. 11 is a diagram used to explain an example of degamma processing. A characteristic 1101 illustrated in FIG. 11 represents an image characteristic in the image sensor 202 of the monitoring camera 101, and a characteristic 1102 represents an input-output characteristic (in the present exemplary embodiment, a gamma characteristic) in the luminance conversion which is performed in the monitoring camera 101. Thus, the monitoring camera 101 outputs an image obtained by performing, in the monitoring camera 101, gamma processing (1102) with respect to the image characteristic (1101) input from the image sensor 202.

In the case of the present exemplary embodiment, input-output characteristic information for luminance conversion which is performed in the monitoring camera 101, i.e., information indicating a gamma characteristic, is assumed to be previously acquired and prepared by, for example, the camera information acquisition unit 404 as a gamma table (luminance conversion table). Furthermore, the gamma characteristic information can be acquired in the state of being held as metadata about an input image, or a plurality of pieces of gamma characteristic information having respective different patterns corresponding to types of monitoring cameras 101 connectable to the client apparatus 103 can be previously stored and the applicable gamma characteristic information can be acquired from among the stored plurality of pieces of gamma characteristic information. Furthermore, such a plurality of pieces of gamma characteristic information having respective different patterns can be stored in, for example, the auxiliary storage device 303, or can be formed by executing a program and then stored in the main storage device 302. For example, in a case where a plurality of pieces of gamma characteristic information having respective different patterns is previously stored, the camera information acquisition unit 404 performs identification information acquisition processing for acquiring, for example, an identifier (ID) indicating the type of the monitoring camera 101, a serial number, and an individual discrimination number. Then, the camera information acquisition unit 404 selects applicable gamma characteristic information from among the previously stored plurality of pieces of gamma characteristic information based on at least any one of such pieces of gamma characteristic information. Furthermore, a gamma characteristic which the camera information acquisition unit 404 acquires (a first input-output characteristic) can be acquired together with an exposure setting value for the monitoring camera to be acquired as described below.

The exposure determination unit 407 acquires gamma characteristic information from the above-mentioned gamma table, and performs degamma processing on an input image coming from the monitoring camera in such a way as to return the input image to a state obtained before the input image is subjected to gamma processing in the monitoring camera, i.e., a state of an image captured by the image sensor 202. In other words, the exposure determination unit 407 performs processing for inversely transforming an image based on a degamma characteristic (a second input-output characteristic), which is an input-output characteristic inverse to the gamma characteristic, which is the first-input-output characteristic, for converting the luminance of an image on the side of the monitoring camera, and thus returns the image to an image obtained before being converted on the side of the monitoring camera.

Next, in step S905, the exposure determination unit 407 performs calculation processing for an exposure correction amount that is based on a luminance value subjected to degamma processing.

Additionally, in step S906, the exposure determination unit 407 acquires the current exposure setting value for the monitoring camera 101 acquired by the camera information acquisition unit 404 from the monitoring camera 101.

Then, in step S907, the exposure determination unit 407 calculates an exposure correction amount for setting the subject region to a correct exposure in a way similar to that in the above-described first exemplary embodiment.

Next, in step S908, the exposure determination unit 407 determines whether the exposure correction amount calculated in step S907 is less than or equal to a predetermined amount. Thus, in step S908, the exposure determination unit 407 performs processing for determining the extent to which the exposure correction amount (the change amount for exposure) is. As mentioned above, since, in a case where the evaluation region differs between on the side of the monitoring camera and on the side of the client apparatus, the exposure correction amount calculated by the client apparatus is likely to become a correction amount greatly different from the reality, the determination processing in step S908 is performed. Even in the second exemplary embodiment, as with the first exemplary embodiment, in a case where the exposure correction amount is greater than the predetermined amount, the exposure determination unit 407 performs coarse adjustment to change exposure at a stretch up to a certain degree of amount and, from that point onwards, progressively performs fine adjustment. In this way, it becomes easy to perform matching of brightness, and it is possible to prevent or reduce an adverse effect in which, if coarse adjustment is performed, hunting of luminance occurs. If, in step S908, it is determined that the exposure correction amount is less than or equal to the predetermined amount (YES in step S908), the client CPU 301 advances the processing to step S909, and, on the other hand, if it is determined that the exposure correction amount exceeds the predetermined amount (NO in step S908), the client CPU 301 advances the processing to step S910.

In step S909, the exposure determination unit 407 outputs, to the monitoring camera 101 via the communication control unit 402, an instruction for controlling the monitoring camera 101 according to the exposure correction amount calculated in step S907. The monitoring camera 101 performs exposure control based on the instruction corresponding to the exposure correction amount, thus becoming able to capture an image in which the subject has a correct brightness.

On the other hand, in step S910, to which the processing has proceeded after, in step S908, it is determined that the exposure correction amount exceeds the predetermined amount, the exposure determination unit 407 outputs, to the monitoring camera 101 via the communication control unit 402, an instruction for changing exposure for the monitoring camera 101 as indicated by the correction amount being large illustrated in FIG. 8 in the first exemplary embodiment.

Next, in step S911, the exposure determination unit 407 measures the brightness of the subject region (face region), and then, in step S912, the exposure determination unit 407 determines whether exposure of the subject region is currently set to a correct value. Then, if, in step S912, it is determined that the exposure is currently set to the correct value (YES in step S912), the client CPU 301 ends the processing in the flowchart of FIG. 10. On the other hand, if, in step S912, it is determined that the exposure is not currently set to the correct value (NO in step S912), then in step S913, the exposure determination unit 407 additionally performs exposure adjustment for the monitoring camera 101 via the communication control unit 402, and then returns the processing to step S911. Then, in step S911, the exposure determination unit 407 measures the brightness of the subject region again, and performs determination processing in step S912. Even in the second exemplary embodiment, the exposure adjustment in step S913 do not greatly change exposure as mentioned above but progressively change exposure while performing fine adjustment. Moreover, even in the second exemplary embodiment, in a case where the exposure determination unit 407 returns the processing to step S911 and re-measures the brightness of the subject region, the exposure determination unit 407 performs measurement after an interval of a predetermined time.

Performing the above-described processing enables obtaining an image with a correct brightness in the second exemplary embodiment. Furthermore, even in the second exemplary embodiment, the behavior of an exchange of processing between the monitoring camera and the client apparatus is similar to that described with reference to FIG. 9.

As described above, according to the second exemplary embodiment, it becomes possible to acquire a stable brightness which does not depend on an exposure setting condition of the monitoring camera 101, so that the monitoring camera 101 becomes able to capture a correct image.

Furthermore, in the above-mentioned technique discussed in Japanese Patent Application Laid-Open No. 4-165876, while the brightness of an image sensor which does not depend on an image capturing condition is able to be obtained by performing degamma processing, there is no disclosure about a method for performing exposure control for an image capturing apparatus based on a result of degamma processing. Moreover, in the above-mentioned technique discussed in Japanese Patent Application Laid-Open No. 2007-102284, processing performed in a case where there is no information about a degamma curve is discussed, but camera control to be performed after degamma processing is not discussed. Therefore, in the techniques discussed in Japanese Patent Application Laid-Open No. 4-165876 and Japanese Patent Application Laid-Open No. 2007-102284, it is supposed that it is impossible to correctly perform camera control which brings about an appropriate brightness with respect to a target image. On the other hand, according to the first and second exemplary embodiments, exposure control which enables obtaining an image with a correct brightness is implemented.

The present disclosure can also be implemented by performing processing for supplying a program for implementing one or more functions of the above-described exemplary embodiments to a system or apparatus via a network or a storage medium and causing one or more processors included in a computer of the system or apparatus to read and execute the program. Moreover, the present disclosure can also be implemented by a circuit which implements such one or more functions (for example, an application specific integrated circuit (ASIC)).

Each of the above-described exemplary embodiments is merely a specific example for implementing the present disclosure, and should not be construed to limit the technical scope of the present disclosure. Thus, the present disclosure can be implemented in various forms without departing from the technical idea or the principal characteristics thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-151228 filed Sep. 9, 2020, which is hereby incorporated by reference herein in its entirety.

What is claimed is:

1. An apparatus capable of communicating with a capturing apparatus, the apparatus comprising:
at least one processor executing instructions that, when executed by the at least one processor, cause the at least one processor to:
acquire an image captured by the capturing apparatus;
acquire first exposure information determined by the capturing apparatus based on a luminance of a first region in the image;
determine second exposure information based on a luminance of a second region;
determine, based on a difference between the first exposure information and the second exposure information, an exposure correction value or an exposure control value according to the exposure correction value;
output, in the case where the exposure correction value is larger than a predetermined value, a new exposure correction value that is approximately equal to the predetermined value or a new exposure control value according to the new exposure correction value, to the capturing apparatus; and
output, in a case where the exposure correction value is equal to or smaller than the predetermined value, the exposure correction value or the exposure control value according to the exposure correction value, to the capturing apparatus.

2. The apparatus according to claim 1, wherein an area of the image indicated by the first region is larger than an area of the image indicated by the second region.

3. The apparatus according to claim 1, wherein the second region includes a specific subject in the image.

4. The apparatus according to claim 1,
wherein the exposure control value is a control value for controlling at least one of an exposure time, a gain, and an aperture in an image capturing operation of the capturing apparatus, according to the exposure correction value.

5. The apparatus according to claim 1, wherein the predetermined value is changed according to a degree of coincidence between the first region and the second region.

6. The apparatus according to claim 1, wherein the at least one processor further to:
acquire a first input-output characteristic of the capturing apparatus concerning the image; and
convert a luminance of the image based on a second input-output characteristic which is an input-output characteristic inverse to the first input-output characteristic,
wherein a determination of the second exposure information based on a luminance of the second region in the image.

7. A method for controlling an apparatus capable of communicating with a capturing apparatus, the method comprising:
acquiring an image captured by the capturing apparatus;
acquiring first exposure information determined by the capturing apparatus based on a luminance of a first region in the image;
determining second exposure information based on a luminance of a second region;
determining, based on a difference between the first exposure information and the second exposure information, an exposure correction value or an exposure control value according to the exposure correction value;
outputting, in a case where the exposure correction value is larger than a predetermined value, a new exposure correction value that is approximately equal to the predetermined value or a new exposure control value according to the new exposure correction value, to the capturing apparatus; and
outputting, in a case where the exposure correction value is equal to or smaller than the predetermined value, the exposure correction value or the exposure control value according to the exposure correction value, to the capturing apparatus.

8. The method according to claim 7, wherein an area of the image indicated by the first region is larger than an area of the image indicated by the second region.

9. The method according to claim 7, wherein the second region includes a specific subject in the image.

10. The method according to claim 7,
wherein the exposure control value is a control value for controlling at least one of an exposure time, a gain, and an aperture in an image capturing operation of the capturing apparatus, according to the exposure correction value.

11. The method according to claim 7, wherein the predetermined value is changed according to a degree of coincidence between the first region and the second region.

12. The method according to claim 7, further comprising:
acquiring a first input-output characteristic of the capturing apparatus concerning the image;
converting a luminance of the image based on a second input-output characteristic which is an input-output characteristic inverse to the first input-output characteristic; and
determining the second exposure information based on a luminance of the second region in the image.

13. A non-transitory computer-readable storage medium storing computer-executable instructions that, when executed by a computer, cause the computer to perform a method for controlling an apparatus capable of communicating with a capturing apparatus, the method comprising:
acquiring an image captured by the capturing apparatus;
acquiring first exposure information determined by the capturing apparatus based on a luminance of a first region in the image;
determining second exposure information based on a luminance of a second region;
determining, based on a difference between the first exposure information and the second exposure information, an exposure correction value or an exposure control value according to the exposure correction value;
outputting, in a case where the exposure correction value is larger than a predetermined value, a new exposure correction value that is approximately equal to the predetermined value or a new exposure control value according to the new exposure correction value, to the capturing apparatus; and
outputting, in a case where the exposure correction value is equal to or smaller than the predetermined value, the exposure correction value or the exposure control value according to the exposure correction value, to the capturing apparatus.

14. The non-transitory computer-readable storage medium according to claim 13, wherein an area of the image indicated by the first region is larger than an area of the image indicated by the second region.

15. The non-transitory computer-readable storage medium according to claim 13, wherein the second region includes a specific subject in the image.

16. The non-transitory computer-readable storage medium according to claim 13,
wherein the exposure control value is a control value for controlling at least one of an exposure time, a gain, and an aperture in an image capturing operation of the capturing apparatus, according to the exposure correction value.

17. The non-transitory computer-readable storage medium according to claim 13, wherein the method further comprises:
acquiring a first input-output characteristic of the capturing apparatus concerning the image;
converting a luminance of the image based on a second input-output characteristic which is an input-output characteristic inverse to the first input-output characteristic; and
determining the second exposure information based on a luminance of the second region in the image.

* * * * *